United States Patent [19]
Weber et al.

[11] Patent Number: 5,626,206
[45] Date of Patent: May 6, 1997

[54] DEVICE FOR AND METHOD OF VERTICALLY ADJUSTING PARTS IN A BIN

[76] Inventors: Dennis R. Weber, 92 Elmridge Rd.; Matthew Z. Neal, 424 Clearview Rd., both of Mansfield, Ohio 44907

[21] Appl. No.: 401,402

[22] Filed: Mar. 9, 1995

[51] Int. Cl.$^6$ .................................................. B66B 9/16
[52] U.S. Cl. ................................ 187/244; 108/136
[58] Field of Search ........................... 187/233, 244, 187/240, 269, 267; 312/71; 108/136

[56] References Cited

U.S. PATENT DOCUMENTS

| | | | |
|---|---|---|---|
| 3,418,031 | 12/1968 | Fisher | 108/136 |
| 3,663,078 | 5/1972 | Moore et al. | 108/136 |
| 3,739,879 | 6/1973 | House | 108/136 |
| 4,545,463 | 10/1985 | Olovsson | 187/244 |
| 4,867,277 | 9/1989 | Sloan | 187/269 |

OTHER PUBLICATIONS

Article on World Class Weight Lifter–Scissor Tables Brochure entitled "The Ultimate" by Contico.

*Primary Examiner*—Kenneth Noland
*Attorney, Agent, or Firm*—Roger D. Emerson

[57] ABSTRACT

A device for and method of ergonomically removing parts from a parts bin, so that an operator does not have to unnecessarily bend to remove parts, using an open-ended container, a platform removably contained within the container, and a mechanism for lifting the platform which is, also, removably contained within the container. The mechanism for lifting the platform may be a manually operated or automatically operated scissor-type jack, hydraulic cylinder, or pneumatic cylinder. Also, the platform may be vertically adjusted by a spring whose spring constant is chosen to correspond to the weight of the parts within the bin.

1 Claim, 4 Drawing Sheets

DEVICE FOR AND METHOD OF VERTICALLY ADJUSTING PARTS IN A BIN

BACKGROUND OF THE INVENTION

1. Field of Invention

The present invention pertains to a vertical adjustment mechanism and, more particularly, to a vertical adjustment mechanism can be mounted within or inserted into a parts bin in order to vertically adjust parts in the bin to eliminate unnecessary bending or movement by a human who must remove parts from the bin.

2. Description of the Related Art

The combination of a vertical adjustment mechanism that can be inserted into a parts bin in order to keep parts at a vertical position that eliminates unnecessary bending when removing a part is thought to be novel.

SUMMARY OF THE INVENTION

It is an object of the present invention to eliminate injuries caused by bending to remove parts from a parts bin.

It is another object of the present invention to disclose a device for and a method of vertically adjusting parts in a parts bin to minimize the bending required to remove a part from the parts bin.

It is another object of the present invention to disclose a device for and method of adjusting the height of parts in a parts bin that is under the control of an human operator.

It is another object of the present invention to disclose a device for and method of vertically adjusting the height of parts in a parts bin that is under the control of an electronic device.

It is another object of the present invention to disclose a device for and method of vertically adjusting parts in a parts bin by a mechanical, hydraulic, or pneumatic mechanism.

It is another object of the present invention to disclose a device for and method of vertically adjusting parts in a parts bin that is portable.

It is another object of the present invention to disclose a device for and method of vertically adjusting parts in a parts bin that is removable from the parts bin.

It is another object of the present invention to disclose a device for and a method of vertically adjusting parts in a parts bin that fits into any size parts bin and vertically adjusts parts of any size or weight.

It is another object of the present invention to disclose a device for and method of vertically adjusting parts in a parts bin that is strong, lightweight, long-lasting, economic, and ergonomic.

It is another object of the present invention to disclose device for and method of vertically adjusting parts in a parts bin using a spring having a spring constant chosen and matched to the weight of the parts stored in the parts bin.

The objects of the present invention are realized by disclosing a device for and method of vertically adjusting parts in a parts bins to a level that minimizes the bending and movement required by a human operator to remove a part from the parts bin. It is believed that injuries would be avoided by eliminating unnecessary bending of the lower back, eliminating unnecessary pulling on the shoulders, eliminating unnecessary pulling on the upper back, and other similar movements.

The present invention discloses a device for and method of vertically adjusting parts in a parts bin that includes a mechanism for accepting input from an operator that results in a vertical adjustment that is under the control of the operator.

The present invention discloses a device for and method of vertically adjusting parts in a parts bin that includes an electronic device that vertically adjusts the parts in a parts bin without any input from an operator. The present invention discloses a device for and method of vertically adjusting parts in a parts bin that utilizes either a mechanical, a hydraulic, and a pneumatic mechanism to vertically adjust the parts in a parts bin. Each of these means for lifting are either under the control of the operator or are controlled electronically or automatically, without any input from an operator.

The present invention discloses a device for and method of vertically adjusting parts in a parts bin that is portable or permanently mounted within the bin.

The lifting mechanism, and the electronic leveling device, when utilized, can be made to fit any size parts bin and level any type of part.

The present invention discloses a device for and method of vertically adjusting parts in a parts bin that is made of strong, lightweight, long-lasting, economic, and ergonomic materials such as polyethylene which will not rust, mildew or deteriorate, is easy to clean, and is impervious to moisture oils, and most chemical agents.

The present invention discloses a device for and method of vertically adjusting parts in a parts bin that uses a calibrated spring as a lifting means. The spring is calibrated or chosen to correspond to the weight of parts stored in the parts bin. The spring constant of the spring (the spring constant is "k" in the equation $F=kx$, where "F" equals the force supplied by the spring and "x" equals a spring displacement distance) is selected so that the weight of the parts removed will cause the platform to move through a distance "x". The distance "x" is also essentially equal to the height of parts being removed from the bin. The force ("F") supplied by the spring causes the platform to rise an height generally equal to the height of the parts removed. Through this mechanism, the spring keeps the parts at the proper height, so that an operator does not have to provide any input to keep the parts in the parts bin at the proper vertical adjustment.

Through the same mechanism, the ergonomic parts bin elevator of the present invention lowers the parts in the parts bins as additional parts are added to the parts bin in order to keep the parts in the parts bin at a vertical position that minimizes the bending required to remove a part from the parts bin. As parts are removed from the parts bin, the present invention raises the level of the parts in the parts bin so that the parts remaining in the parts bin maintain the vertical position that minimizes the bending required to remove a part from the parts bin.

The present invention can be made to be portable or stationary. It can be designed to fie into any existing parts bin. It can be made to vertically adjust to any type of part.

The advantages and benefits of the present invention are that bending is minimized, and therefore, injuries due to bending are reduced. Damage to parts is reduced, since fewer parts will be dropped due to the lower strain associated with the minimized bending of the present invention. The present invention is easy to use, can be automatic, and requires minimal maintenance.

Productivity is increased due to the reduced time and strain required to move parts in and out of the parts bin, and costs and expenses are minimized, due to a reduction in parts damage.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
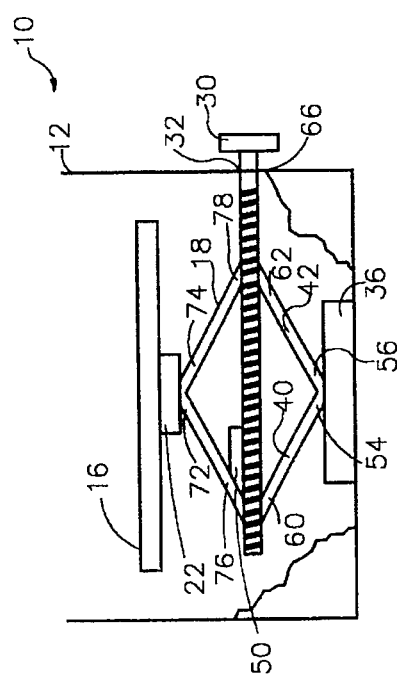
FIG. 1 is a cut-away schematic front view of a first embodiment of the present invention.

Referring now to the drawings wherein the showings are for purposes of illustrating a preferred embodiment of the invention only and not for purposes of limiting the same, the present invention is a device for and method of vertically adjusting parts in a parts bins to a level that minimizes the bending required of a human operator to remove a part from, or add parts to, the parts bin. FIG. 1 is a cut-away view of a first embodiment 10 of the present invention.

The first embodiment 10 of the present invention includes a parts bin 12 for holding parts (not shown) on a platform 16 for defining the lowest vertical position that a part can take in the parts bin 12, and a lifting mechanism 18 for vertically adjusting the platform 16 so that the parts in the parts bin 12 are always at a vertical position that minimizes the bending required of an operator to remove parts from, or add parts to, the parts bin 12. Platform 16 may be a container which is attached to the planar platform 16 or upper panel 22. Platform 16 can be permanently or removably attached to upper panel 22.

The lifting mechanism 18 for lifting the platform 16 can be realized in any one of a number of ways. One possible realization is a scissor-type jack 26 as depicted in FIG. 1. The scissor-type jack 26 shown in FIG. 1 has a crank 30 extending through an opening 32 in the parts bin 12. The crank 30 enables an operator to vertically adjust the level of the parts to a level that minimizes the bending required of an operator to remove parts from, or add parts to, the parts bin 12. The scissor-type jack 26 of FIG. 1 includes a pedestal 36, a first support member 40, a second support member 42, a third support member 44, a fourth support member 46, planar platform 16, a threaded bar 50, and a crank 30.

The first support member 40 and the second support member 42 are pivotally joined to the pedestal 36 at a first end 54, 56 respectively. A second end 60 of the first support member 40 and second end 62 of the second support member 42 each have a threaded hole (not shown). The threaded hole of the first support member 40 faces the threaded hole of the second support member 42 so that the threaded bar 50 can travel through these holes to adjust the distance between the first support member 40 and the second support member 42 and, therefore, the vertical position of the platform 16. The crank 30 is connected to a first end 66 of the threaded bar 50 and is used to adjust the distance between the first support member 40 and the second support member 42. The third support member 44 and the fourth support member 46 are pivotally joined to the upper panel 11 at their first ends 72, 74, respectively. The second end 76 of the third support member 9 and the second end 78 of the fourth support member 10 each have a threaded hole (not shown). The threaded hole of the third support member 44 faces the threaded hole of the fourth support member 46. The threaded-hole end of the third support member 44 is pivotally joined to the threaded-hole end of the first support member 40 so that the threaded bar 50 can travel through these holes and adjust the vertical position of the upper panel 11 and, therefore, the platform 16. The threaded-hole end of the fourth support member 46 is pivotally joined to the threaded-hole end of the second support member 42 so that the threaded bar 50 can travel through these holes and adjust the vertical position of the upper panel 22 and, therefore, the platform 16. Vertically adjusting the upper panel 22 via the crank 30 results in the vertical adjustment of the platform 16 and the parts.

Figure 2:
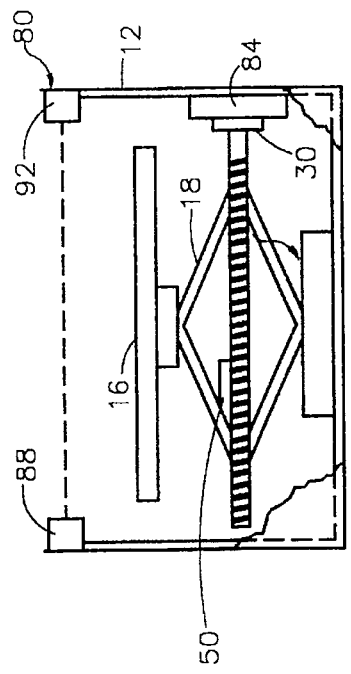
FIG. 2 is a cut-away schematic front view of a second embodiment of the present invention.

FIG. 2 depicts a second embodiment 80 of the present invention that is, essentially, the same as the device of FIG. 1 with the addition of electronics to automatically adjust the vertical position of the parts. In FIG. 2, the lifting mechanism 18 (e.g., a scissor-type jack 26) for vertically adjusting the parts, is fully contained within the parts bin 12. A motor 84 automatically turns the crank 30 of the scissor-type jack 26 in order to raise, or lower, the lifting mechanism 18. A light-emitting diode (LED) 88 is attached to the inside top of one of the walls of the parts bin 12. A photo-detector 92 is attached to the inside top wall of the parts bin 12 that is directly across from, and in the light path of, the light-emitting diode 88. The light-emitting diode 88 and the photo-detector 92 are electrically connected to the motor 84 so that the motor 84 will turn the crank 30 and vertically adjust the platform 16 and the parts, so that the light beam from the light-emitting diode 88 is just barely interrupted. Electronics (not shown) are contained within the motor 84 that turns the crank 30 so that the platform 16 is vertically adjusted to the point where the light beam from the light-emitting diode 88 is just interrupted. The electronics in the motor 84 will periodically raise, and lower, the platform 16 in order to check the position of the platform 16 to maintain the vertical position of the parts to a level that just barely interrupts the light from the light-emitting diode 88. This ensures that the vertical position of the platform 16 is lowered whenever parts are added to it. When parts are removed, the light from the light-emitting diode 88 is no longer interrupted. Photo-detector 92 then detects light emitted from the light-emitting diode 88 and signals the motor 84 to turn the crank 30 in order to raise the platform 16 and parts positioned thereon, so that the light from the light-emitting diode 88 is interrupted once again. This ensures that the parts in the parts bin 12 are always at the vertical position that minimizes the bending required of an operator to remove a part from, or add a part to, the parts bin 12.

Figure 3:
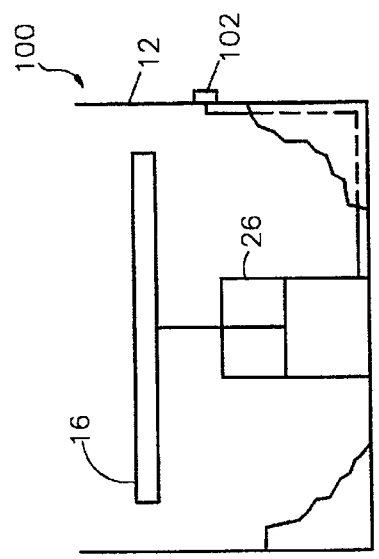
FIG. 3 is a cut-away schematic front view of a third embodiment of the present invention.

FIG. 3 depicts the third embodiment 100 of the present invention that is, essentially, the same as the device of FIG. 1 with a different type of lifting mechanism 18. In FIG. 3, the lifting mechanism 18 can be either a hydraulic cylinder or a pneumatic cylinder. As in FIG. 1, the lifting mechanism 18 of FIG. 3 extends outside of the parts bin 12 so that an operator can provide an input via a control device 102 (e.g., a switch) to control the vertical position of the platform 16 and, therefore, the vertical position of the parts in the parts bin 12.

Figure 4:
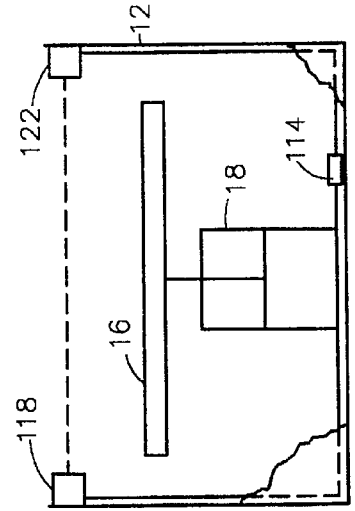
FIG. 4 is a cut-away schematic front view of a fourth embodiment of the present invention.

FIG. 4 depicts a fourth embodiment 110 of the present invention that is, essentially, the same as the device of FIG. 3 with the addition of electronics to automatically adjust the vertical position of the parts in the parts bin 12. In FIG. 4, the lifting mechanism 18 (i.e., either a hydraulic cylinder or a pneumatic cylinder) is fully contained within the parts bin 12. A motor 114 is added that automatically adjusts the vertical position of the lifting mechanism 18. A light-emitting diode 118 is attached to the inside top of one of the walls of the parts bin 12. A photo-detector 122 is attached to the inside top wall of the parts bin 12 that is directly across from, and in the light path of, the light-emitting diode 118. The light-emitting diode 118 and the photo-detector 122 are connected to the motor 114 so that the motor 114 will raise, or lower, the lifting mechanism 18 and, therefore, vertically adjust the platform 16 and the parts enough to just barely interrupt the light beam from the light-emitting diode 118 to the photo-detector 122. Electronics (not shown) are contained within the motor 114 to adjust the vertical position of the lifting mechanism 18 so that the platform 16 is vertically adjusted to the point where the light beam from the light-emitting diode 118 is just interrupted. The electronics in the motor 114 will periodically raise, and lower, the platform 16 in order to check the position of the parts. This ensures that the vertical position of the platform 16 is lowered whenever parts are added to the parts bin 12. When parts are removed from the parts bin 12, the light from the light-emitting diode 118 will no longer be interrupted and the photo-detector 122 will detect light emitted from the light-emitting diode 118 and signal the motor 114 to vertically adjust the lifting mechanism 18 in order to raise the platform 16 and parts positioned thereon, so that the light from the light-emitting diode 118 is interrupted once again. This ensures that the parts are always at the vertical position that minimizes the bending required of an operator to remove a part from, or add a part to, the parts bin 12.

Figure 5:
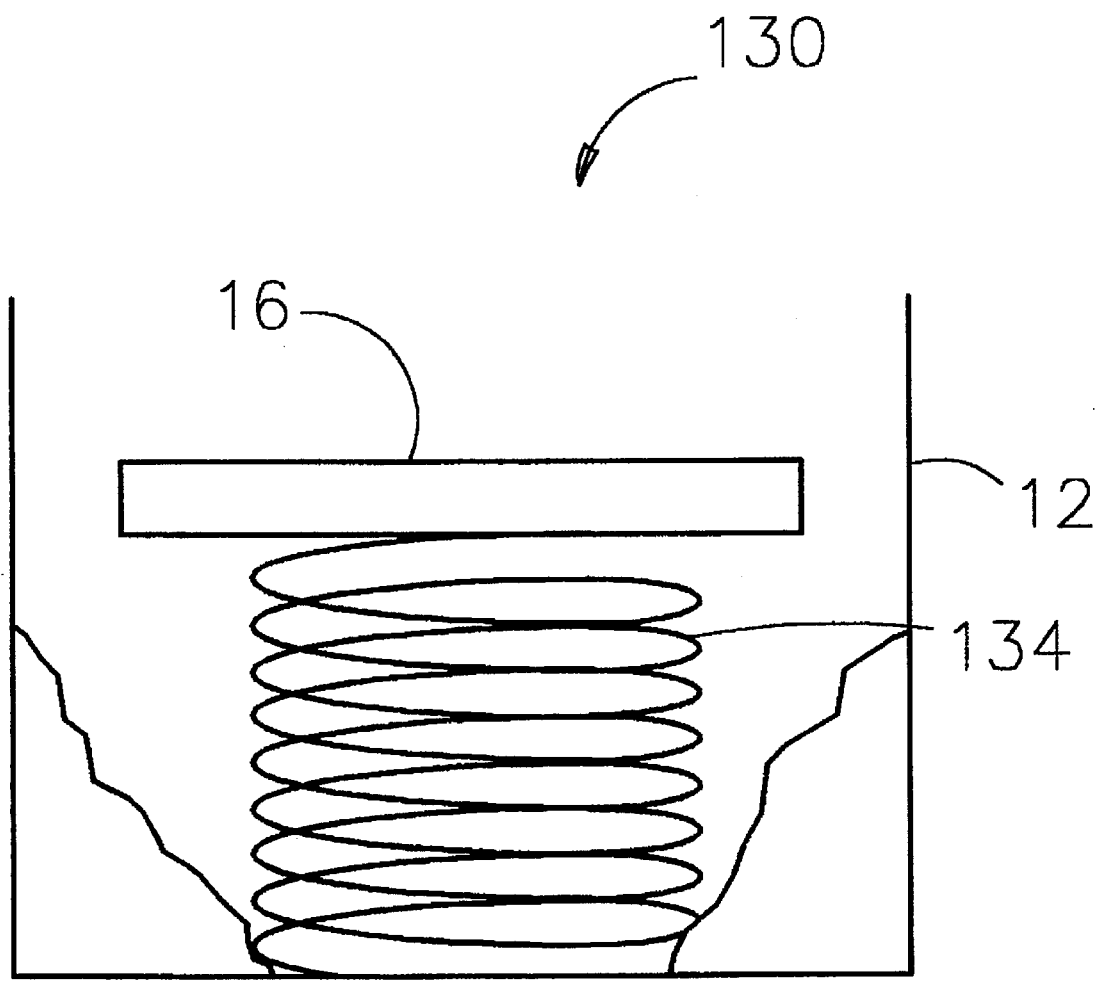
FIG. 5 is a cut-away schematic front view of a fifth embodiment of the present invention.
Figure 6:
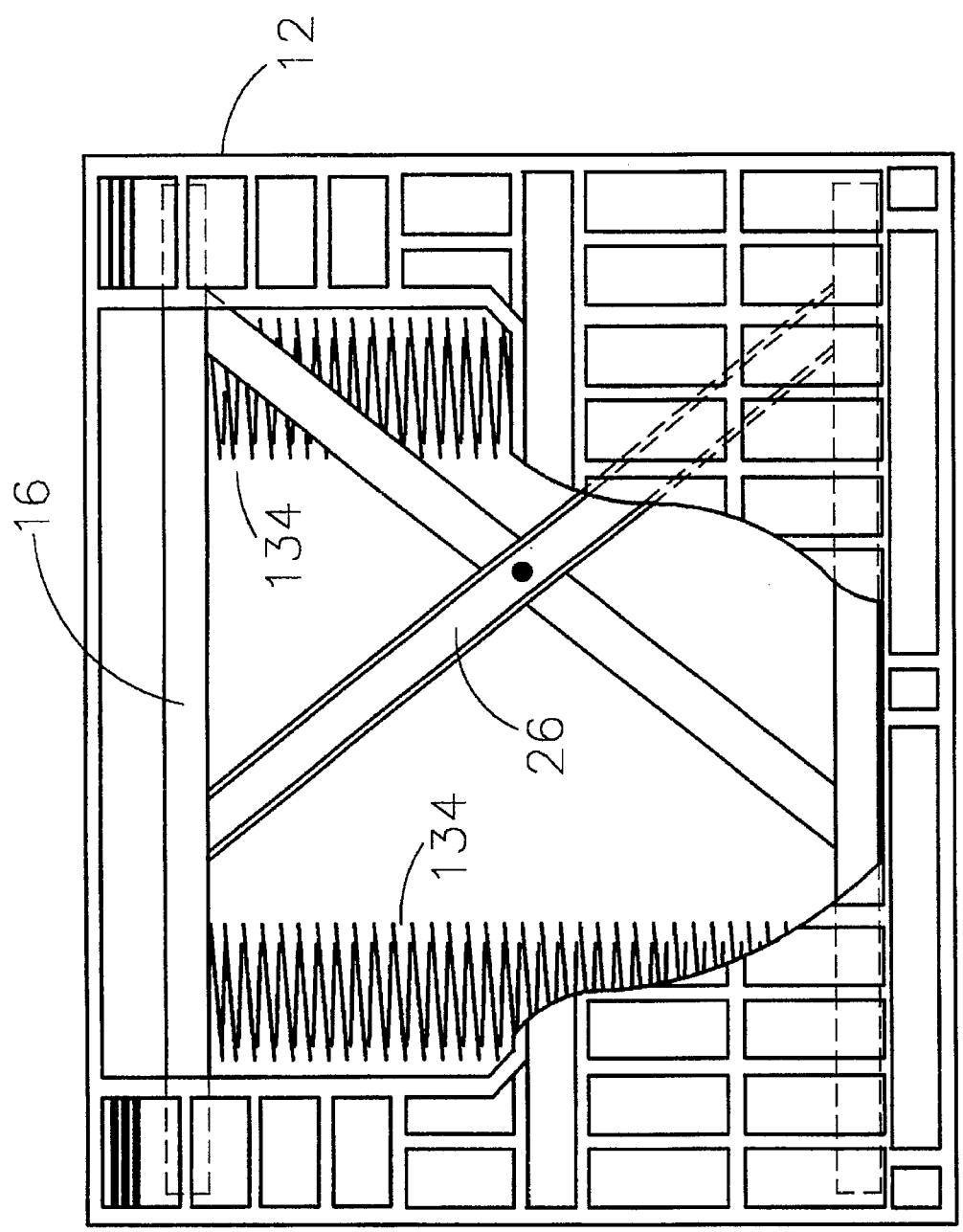
FIG. 6 is a cut-away front view of a container according to the present invention.
Figure 7:
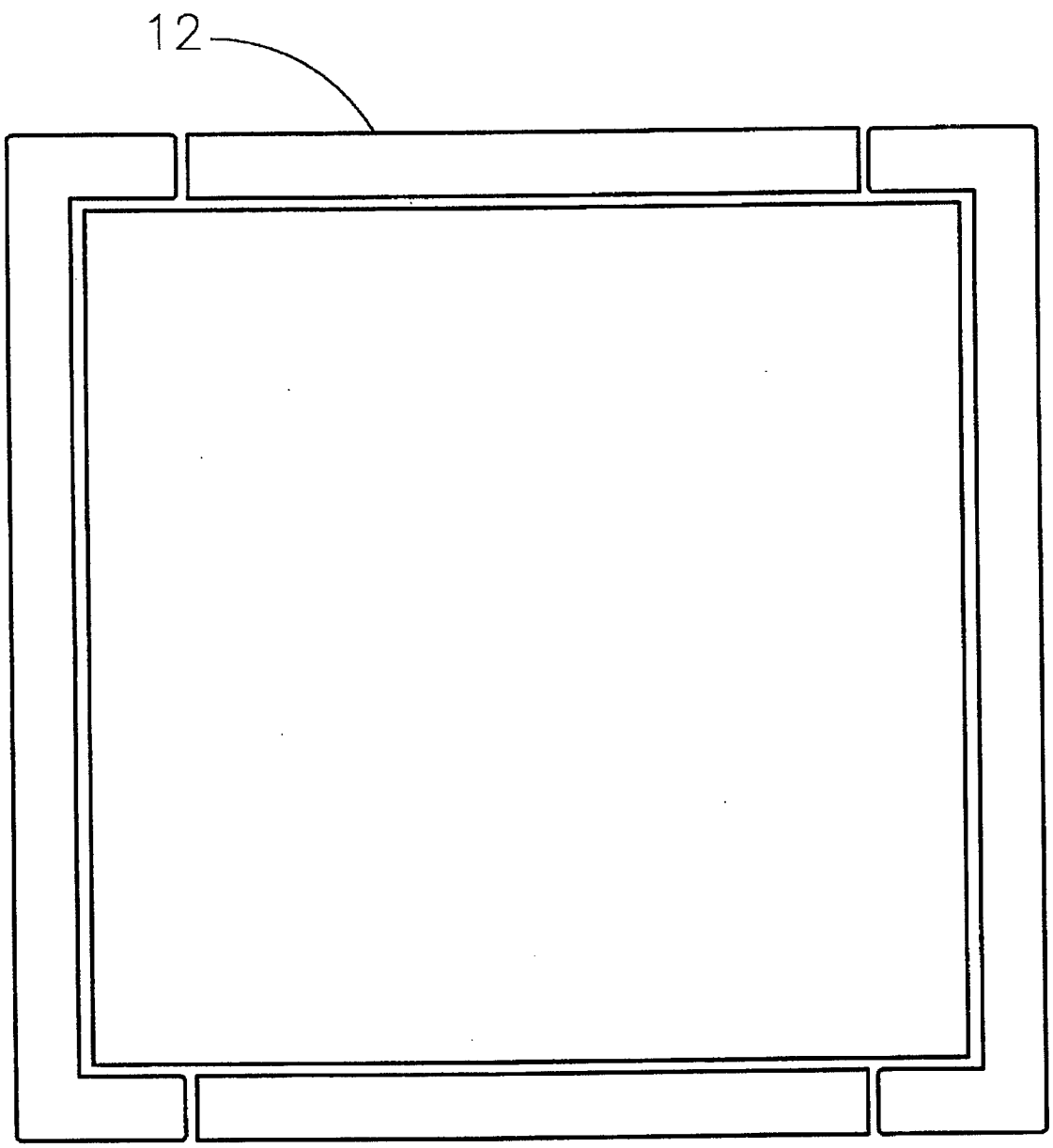
FIG. 7 is a cut-away top front view of the container of FIG. 6 of the present invention.

FIG. 5 is a cut-away front view of a fifth embodiment 130 of the present invention. The fifth embodiment 130 is, essentially, the same as the devices of FIGS. 2 and 4 with a different type of lifting mechanism 18. The lifting mechanism 18 of FIG. 5 is a calibrated spring 134. The spring 134 must be calibrated for the type of pare placed on platform 16 of the parts bin 12, so that the vertical position of the parts is always at the vertical position that minimizes the bending required of an operator when removing parts from, or adding parts to, the parts bin 12.

All of the embodiments of the present invention can be stationary or portable. All of the embodiments of the present invention can be constructed to fit any size parts bin 12 and vertically adjust any type (e.g., size, weight, etc.) of part.

The materials used to construct the present invention may be strong, lightweight, long-lasting, economic, and ergonomic. For example, polyethylene (which will not rust, mildew or deteriorate, is easy to clean, and is impervious to moisture, oils, and most chemical agents) may be used.

The invention has been described with reference to a preferred embodiment, obviously, modifications and alternations will occur to others upon a reading and understanding of the this specification. It is intended to include all such modifications and alterations in so far as they come within the scope of the appended claims or The equivalents thereof.

Having thus described the invention, it is now claimed:

1. An ergonomic parts bin, comprising;.

a container;

a platform disposed within said container constructed so as to hold parts thereon;

lifting means for lifting, where said lifting means is disposed between said base and said platform, said lifting means for lifting further constructed so as to vertically adjust said platform; and, means for keeping parts in said container, said means for keeping parts constructed so as to be in communication with a leveling means, said leveling means constructed so as to maintain said means for keeping parts at a constant level as parts in the container are removed, where said leveling means is in communication with said lifting means and said leveling means comprises:

a) a light-emitting diode, positioned on an inside top portion of one of said walls of said container such that light is emitted toward one of said walls positioned directly across from said wall having said light-emitting diode positioned thereon;

b) a photo-detector, positioned on one of said walls, said photo-detector being positioned so as to be directly across from said light-emitting diode, said photo-detector being further positioned so as to be in a path of the emitted light; and, c) a processor in communication with said light-emitting diode, said photo-detector, and said lifting means, said processor constructed so as to cause said lifting means to vertically adjust said platform whenever said photo-detector detects light from said light-emitting diode, the light from said light-emitting diode being interrupted whenever parts in said container are vertically adjusted to a proper level.

* * * * *